July 26, 1938. R. R. ROEMER 2,124,956
CONCRETE CART
Filed July 29, 1936 2 Sheets-Sheet 1

INVENTOR.
Ralph R. Roemer
BY Slough and Canfield
HIS ATTORNEYS.

July 26, 1938.　　　　　R. R. ROEMER　　　　　2,124,956
CONCRETE CART
Filed July 29, 1936　　　　　2 Sheets-Sheet 2

INVENTOR.
Ralph R. Roemer.
BY Slough and Canfield
His ATTORNEYS.

Patented July 26, 1938

2,124,956

UNITED STATES PATENT OFFICE 2,124,956

CONCRETE CART

Ralph R. Roemer, Cleveland, Ohio, assignor, by mesne assignments, to Harry R. Canfield, Cleveland, Ohio Application July 29, 1936, Serial No. 93,192

3 Claims. (Cl. 280—51)

This invention relates to carts for transporting and dumping materials and relates particularly to hand operated carts.

One illustrative use of carts of this class is for the transportation of concrete from a mixing station to a concrete mold and for dumping it thereinto and my invention will be described herein as applied to that use.

Carts of this class have comprised generally a pair of ground heels supporting a box-like body adapted to be rocked or tipped forwardly on the wheel axis to dump out the contents.

Heretofore such carts have been provided with wheels of large diameter of the order of 44" as the obvious means of giving the cart body sufficient ground clearance to permit it to be tipped over sufficiently far to completely empty it.

However, more recently it has become desirable to equip carts, such for example, as those used to carry concrete, with rubber tired wheels, and to make it possible to renew or replace the tires conveniently and cheaply, and it is obviously desirable to utilize for this purpose the most popular sizes of automotive vehicle pneumatic tires. But these tires are of relatively small diameter, such as 32", and have heretofore been impracticable to use on a concrete cart for the following reasons:

The body of the cart when filled with concrete must be approximately balanced on the axis of the wheels, the cart being designed to dispose part of the load below the axis of the wheels for this purpose. The body of the cart thus clears the ground by an amount less than the radius of the wheel and can only tip or rock forward through a limited angle before it strikes the ground.

There is furthermore a maximum size of body which when filled with concrete can be operated by a workman, that is, propelled and dumped and heretofore such size of body has required high wheels to give the necessary clearance for dumping.

Therefore the maximum size and capacity of body which can be dumped with 32" wheels, in carts as heretofore constructed is considerably less than the operable maximum and to transport and dump a given cubic footage of concrete would require an excessive number of undersized carts and a corresponding excessive number of workmen.

Thus it becomes a problem to provide a cart which can have a body of the maximum operable capacity and which can be completely emptied by dumping, and which at the same time can be supported on wheels as small as 32" in diameter; and to provide such a cart is the primary object of this invention.

Among the other objects are:

To provide a dump cart of the two-wheel class constructed to operate in an improved manner.

To provide an improved dump cart adapted to run on pneumatic rubber tired wheels.

To provide a cart of the class referred to which will be economical to construct, efficient to operate and durable in use.

To provide in a cart of the class referred to improved means for mounting the wheels on the cart body.

To provide in a cart of the class referred to an improved handle and body prop construction.

Other objects will be apparent to those skilled in the art to which my invention appertains.

My invention is fully disclosed in the following description taken in connection with the accompanying drawings in which.

Figure 1:
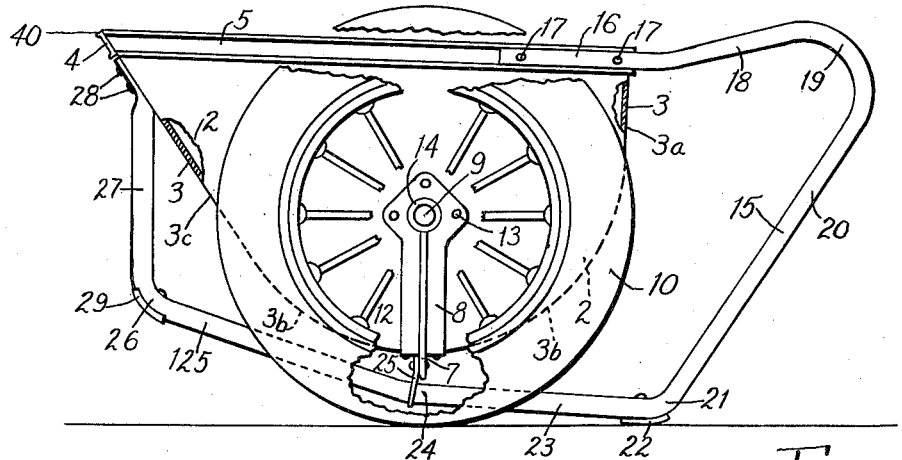
Fig. 1 is a side elevational view of a cart embodying my invention with parts broken away and parts in section for clearness.
Figure 2:
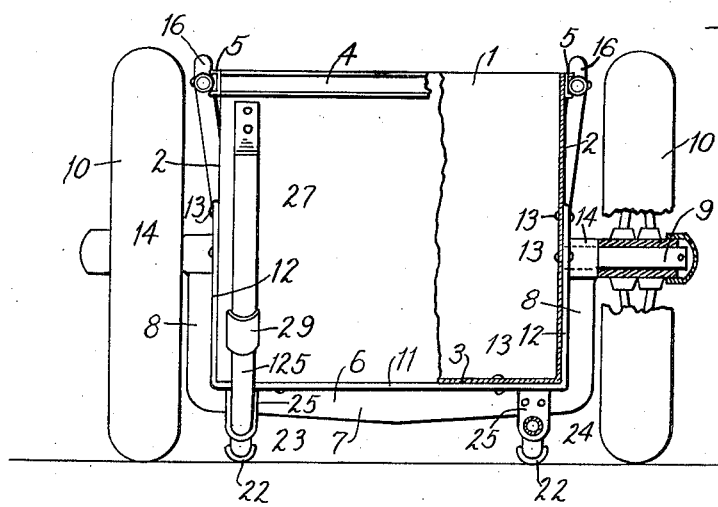
Fig. 2 is an end view of the cart of Fig. 1 with parts broken away and parts in section for clearness, the view being taken from the front or left side of the embodiment of Fig. 1.

Referring to the drawings, Figs. 1 and 2, I have shown at 1 a cart body made from sheet metal comprising vertical side walls 2—2 and a continuous rear wall, bottom wall and front wall element 3 bent around and secured as by welding or like means to the peripheries of the side walls on their rear, bottom and front portions. The wall element 3 thus extends generally vertically at the rear as at 3a, is curved generally cylindrically as at 3b—3b in the lower portions thereof, and, forwardly as at 3c, and is generally planar in an upwardly forwardly inclined direction.

A channel 4 extends across the front of the body at the top thereof and side channels 5—5 extend rearwardly along the sides thereof and are secured to the body by welding or the like to reinforce the body. A similar channel, not shown, may extend across the rear of the body at the top.

At 6, generally, is a hanger element comprising a transverse portion 7 extending transversely of and under the body 1 and comprising vertical portions 8—8 extending upwardly along opposite outer portions of the body. At their upper ends the vertical portions 8 have secured thereto oppositely extending axially aligned axle portions 9—9 upon which wheels 10—10 are rotatably mounted.

In the form of Figs. 1 and 2, the hanger element 6 is formed in one piece from cast metal. The transverse and vertical portions 7 and 8 thereof are provided with flanges 11 and 12 respectively which lie flat upon the bottom and sides of the body and are rigidly secured thereto by bolts, rivets, or the like, 13—13, projected through the flanges and through the wall of the body.

At the upper ends of the vertical portions 8, they are provided with heads 14 and the axles 9—9 are secured thereto by being driven into bores in the head 14 and may be secured therein by pins or other means not shown.

While a simple sleeve bearing for the wheels 10—10 is shown on the axles 9—9, this part of the structure may be varied by providing ball or roller type bearings.

The axis of the axles 9—9 is so disposed with relation to the volume of the body 1 that liquid contents in the body when filled to its practicable depth, will have the center of gravity thereof approximately at or slightly above the axis.

A pair of frame elements shown generally at 15—15 are provided, one on each side generally of the body and are preferably formed from a single piece of tubing bent in a suitable form as follows. One end portion 16 of the frame element is laid in the concave side of the channel 5 and secured thereto as by bolts or rivets 17—17, or may be welded thereto. Rearwardly therefrom, the frame element is bent upwardly as at 18 and then formed into a curved portion 19 from which it extends downwardly forwardly as at 20 to a corner 21. The portions 18, 19 and 20 provide a handle. The corner 21 normally rests upon the ground and may be provided with a shoe 22 to take wear. From the corner 21, the frame element extends upwardly forwardly as at 23 to a point 24 adjacent the hanger element transverse portion 7 and is rigidly secured thereto by passing through a perforation in a bracket 25 rigidly mounted on the hanger element adjacent one side of the body. Beyond the hanger element, the frame element is bent upwardly forwardly as at 125 at a steeper angle than the portion 23 and has a corner 26 from which it extends upwardly vertically as at 27 and is secured at its upper end as at 28 to the body. The corner 26 has preferably thereon a shoe 29 to take wear.

The frame elements 15—15 are rigid and are rigidly secured to the body at the three points above mentioned and therefore are substantially integral therewith.

Figure 3:
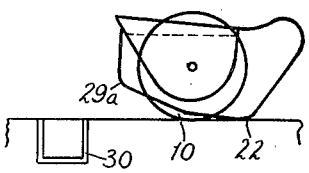

In operation, the body may be filled with concrete or other material while resting upon the wheels 10—10 and shoes 22—22. The operator then raises the handle portions 18—19—20 and pushes thereon to propel the loaded cart forwardly on the wheels. In its normal position when being filled, the entire cart takes the position illustrated diagrammatically in Fig. 3.

Figure 4:
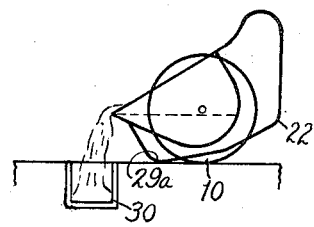

The loaded cart, assuming it is loaded with concrete, is then moved forwardly toward a concrete mold or the like, 30, which is to be filled and is stopped at a suitable distance from the mold as in Fig. 4. The operator then raises the handles and rocks the cart body and the frame element around the axis of the wheels until the shoe 29 engages the ground, whereupon the rocking movement is stopped and the structure supported by the shoe 29 and wheels 10. A part of the contents of the body will thereupon be discharged as indicated in Fig. 4 thus lightening the load and thereafter the operator may raise the handle portions and rock the entire structure about the shoes 29 as in Fig. 5 so as to incline the body sufficiently to empty all of the contents thereof into the mold 30.

Figure 5:
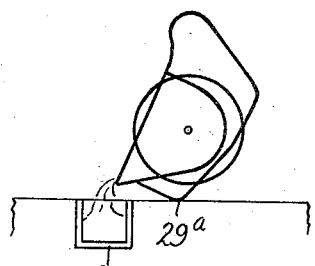
Figs. 3, 4 and 5 are diagrammatic views illustrating the general principles of construction of my invention and a mode of operation thereof.

It will be observed that the shoes 29 define a fulcrum 29a of small area upon which the cart is rocked, so that upon rocking it on the fulcrum from the position of Fig. 4 to that of Fig. 5 the extreme forward end of the body has little forward movement, its movement being largely downwardly so that if the fulcrum 29a is positioned as in Fig. 4 to initiate dumping of the contents, the entire contents can be dumped by rocking it around the fulcrum, and the contents may be received in a relatively small mold due to the small forward motion of the body during its rocking around the fulcrum.

Figure 6:
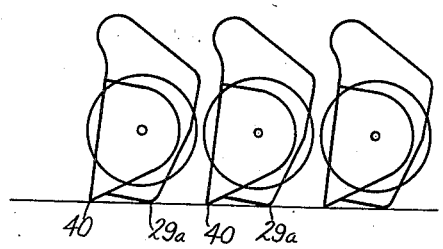
Fig. 6 is a view similar to Figs. 3, 4 and 5 but illustrating another use of the operative features of my invention.

The small area fulcrum provided by the shoes 29 at the corner 26 of the frame element, not only provides for efficient dumping of the load as just described, but, in connection with the forward extremity 40 of the body, provides means for storing or stacking a number of such carts in relatively small space. This is illustrated diagrammatically in Fig. 6 where a number of such carts, as those described above, stand stably upon the forward extremity 40 of the cart body and the said fulcrum 29a. Since the front to rear dimension of the cart is greater than its top to bottom dimension, such carts can be stored in smaller space than if they stood on their wheels.

Figure 8:
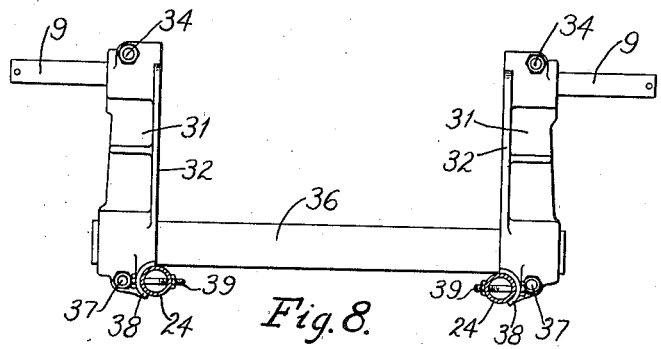
Fig. 8 is a view similar to Fig. 7 illustrating a modification.
Figure 9:
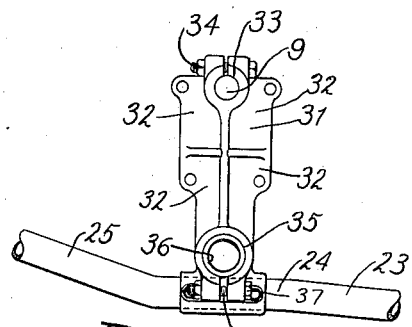
Fig. 9 is a side elevational view of the parts of Fig. 8.

In Figs. 8 and 9 is illustrated a modification of the construction of the hanger element. This hanger element is made of two casting parts 31—31 having flanges 32—32 by which they may be riveted or bolted to the sides of the cart body. At the upper ends thereof, the axles 9 are inserted in split bores 33 which are clamped upon the axles, to rigidly mount them in the bores, by bolts 34—34.

Figure 7:
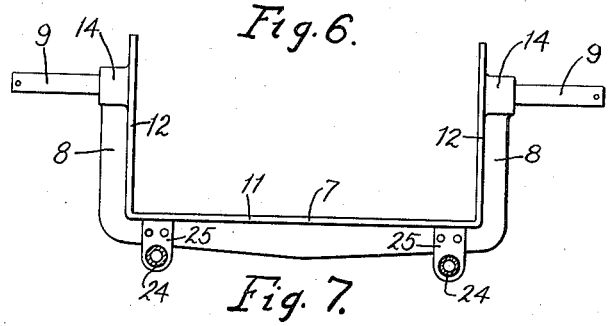
Fig. 7 is a view illustrating separately parts of the embodiment of Fig. 2.

At the lower ends of the parts 31—31, they are provided with relatively large split bores 35 into which are inserted the opposite ends of a piece of pipe 36 which ends are clamped in the bores by bolts 37—37. A rigid structure is thus made which performs the functions above described for the first form of hanger element shown separately in Fig. 7.

At the lower ends of the parts 31—31 they are provided with arcuate inwardly concave flanges 38—38 in the concavities of which the frame portions 24—24 are lodged and the frame portions are rigidly secured to this hanger element by bolts 39—39 projected through the flanges 38 and through the tubular frame element portion 24.

My invention is not limited to the exact details of construction illustrated and described. Changes and modifications may be made within the spirit of my invention without sacrificing its advantages and within the scope of the appended claims.

I claim:

1. A cart comprising a body, a pair of supporting side wheels, a hanger element having a portion extending transversely under the body and side portions extending upwardly on opposite sides thereof and having wheel bearing elements thereon, a frame element extending longitudinally under the body and secured at an intermediate portion to the transverse portion of the hanger element and extending forwardly therefrom and secured at its forward end portion to the body and extending rearwardly therefrom to provide a handle and having its rearward end portion secured to the body, the forward portion having a bend therein to provide a pivot on which the body may be rocked to empty its contents.

2. A cart comprising a body having a forward portion over which contents of the body may be dumped, a pair of supporting side wheels, a pair of elongated frame elements extending each rearwardly from an upper portion of the body, then bent downwardly and forwardly providing a rearward handle portion, then bent forwardly and upwardly to provide at the bend a rear body support and extending under the body and secured thereto, then extending forwardly from the body and then upwardly at an angle and secured to the body and providing at the angle a fulcrum normally above the ground and rearwardly of the forward body portion when the body is in its normal load carrying position upon which the body may be rocked to dump the contents thereof.

3. A cart comprising a body having a forward portion over which contents of the body may be dumped, a pair of supporting side wheels, a pair of elongated frame elements extending each rearwardly from an upper portion of the body, then bent downwardly and forwardly providing a rearward handle portion, then bent forwardly and upwardly to provide at the bend a rear body support and extending under the body and secured thereto, then extending forwardly from the body and then upwardly at an angle and secured to the body and providing at the angle a fulcrum normally above the ground when the body is in its normal load carrying position upon which the body may be rocked to dump the contents thereof.

RALPH R. ROEMER.